United States Patent [19]

Olstowski

[11] 3,883,484

[45] May 13, 1975

[54] RAPID SETTING POLYURETHANES FROM DIOLS AND POLYISOCYANATES IN THE PRESENCE OF A HYDROXYL-CONTAINING HALOGENATED ALIPHATIC COMPOUND

[75] Inventor: Franciszek Olstowski, Freeport, Tex.

[73] Assignee: The Dow Chemical Company, Midland, Mich.

[22] Filed: Dec. 7, 1973

[21] Appl. No.: 422,829

Related U.S. Application Data

[63] Continuation-in-part of Ser. No. 358,245, May 7, 1973, Pat. No. 3,801,532, which is a continuation-in-part of Ser. No. 205,697, Dec. 7, 1971, abandoned.

[52] U.S. Cl..... 260/77.5 MA; 260/18 TN; 260/30.2; 260/30.4 N; 260/30.6 R; 260/31.2 N; 260/31.6; 260/31.8 R; 260/33.4 UR; 260/33.6 UB; 260/33.8 UB; 260/75 NP; 260/77.5 AP

[51] Int. Cl............................................ C08g 22/16

[58] Field of Search............ 260/33.4 UB, 75 NP, 260/77.5 MA, 30.4 N, 30.2, 33.8 UB

[56] References Cited

UNITED STATES PATENTS

| | | | |
|---|---|---|---|
| 3,102,875 | 9/1963 | Heiss................................ | 260/30.4 N |
| 3,143,517 | 8/1964 | Heiss................................ | 260/32.2 |
| 3,294,713 | 12/1966 | Hudson...................... | 260/77.5 MA |
| 3,746,692 | 7/1973 | Olstowski................... | 260/77.5 MA |
| 3,801,532 | 4/1974 | Olstowski.................... | 260/33.8 UB |

*Primary Examiner*—Eugene C. Rzucidlo
*Attorney, Agent, or Firm*—James G. Carter

[57] ABSTRACT

Mixtures comprising a low molecular weight diol, a liquid modifier compound such as a hydroxyl-containing halogenated aliphatic compound, a polyisocyanate having a functionality of at least about 2.5 and an organometallic catalyst instantly set, after a brief induction period, to a solid, dense, rigid polymeric product which can be demolded within a period of from less than 1 to about 5 minutes.

16 Claims, No Drawings

RAPID SETTING POLYURETHANES FROM DIOLS AND POLYISOCYANATES IN THE PRESENCE OF A HYDROXYL-CONTAINING HALOGENATED ALIPHATIC COMPOUND

This application is a continuation-in-part of application Ser. No. 358,245, filed May 7, 1973 now U.S. Pat. No. 3,801,532 which is a continuation-in-part of application Ser. No. 205,697, filed Dec. 7, 1971, now abandoned.

This invention relates to polyurethanes and more particularly it relates to rigid, dense, rapid-setting polyurethane compositions.

Rapid setting polyurethane compositions are known in the art such as those taught in U.S. Pat. No. 3,378,511; however, these rapid-setting urethane compositions require the use of polyols having a functionality of at least 3.

It has now been unexpectedly discovered that rapid-setting, rigid polyurethanes can be prepared from difunctional polyols when the polyisocyanate has a functionality of at least about 2.5.

The term "rapid-setting" as used herein means that the composition will rapidly solidify without the application of external sources of heat and can be removed from a mold within 5 minutes and preferably within 3 minutes from the time the organo-metallic catalyst is mixed into the composition. Upon removal from the mold, the products have sufficient strength to be handled and normally have sufficient strength to be employed for their intended purpose; however, the physical properties, if desired, usually can be improved by post curing at elevated temperatures.

The term "dense" as employed herein means that the polyurethane product has a density of at least about 1.0 grams/cc.

The term "rigid" as employed herein means that the product has an elongation value of less than about 100 percent.

The rigid, dense, rapid-setting polyurethane compositions of the present invention which can be demolded within less than about 5 minutes and preferably less than about 3 minutes are obtained by intimately admixing a composition comprising A. a dihydroxyl-containing compound having a hydroxyl equivalent weight of less than about 250;

B. an organic polyisocyanate having an NCO functionality of at least about 2.5;

C. a liquid modifier compound having a boiling point of at least about 150°C or a hydroxyl-containing halogenated aliphatic compound having a boiling point below about 150°C and which moderates the reaction exotherm between components (A), (B), and (D) without substantial reaction therewith except when said modifier is a hydroxyl-containing halogenated aliphatic compound, and D. an organometallic catalyst;

wherein components (A) and (B) are present in quantities such that the NCO:OH ratio is from about 0.8:1 to about 1.5:1 and preferably from about 0.9:1 to about 1.2:1, the quantity of component (C) is from about 10 to about 50 and preferably from about 20 to about 40 percent by weight of the combined weight of components (A), (B) and (C) with the proviso that when component (C) is a haloaliphatic compound, it is employed in a quantity from about 0.2 to about 50 and preferably from about 2 to about 20 percent by weight based on the combined weight of (A), (B) and (C), and when the haloaliphatic compounds also contain hydroxyl groups, from about 0.2 to about 10, preferably from about 1 to about 5 percent by weight of the combined weights of components (A), (B) and (C), and component (D) is present in quantities of from about 0.1 to about 10, preferably from about 0.1 to about 2.0 percent by weight of the combined weight of components (A), (B) and (C).

Suitable dihydroxyl-containing compounds having an OH equivalent weight below about 250 which are employed as component (A) include, for example, ethylene glycol, propylene glycol, butylene glycol, pentanediol, hexanediol, diethylene glycol, dipropylene glycol, bisphenol A, resorcinol, catechol, hydroquinone, mixtures thereof, adducts of a dihydroxyl-containing compound and a vicinal epoxy compound such as, for example, ethylene oxide, 1,2-propylene oxide, 1,2-butylene oxide, epichlorohydrin, epibromohydrin, mixtures thereof and the like. When the dihydroxyl containing compound is a solid it is suitably employed by dissolving it in a suitable solvent selected from those compounds which are suitably employed as component (C) such as, for example, tri-n-butyl phosphate, triethyl phosphate and the like.

Suitable polyisocyanates which are employed as component (B) in the polyurethane compositions of the present invention include those having an average NCO functionality of at least about 2.5 such as, for example, the polymethylene polyphenyl isocyanates, NCO-containing prepolymers such as the reaction products of an excess of an organic diisocyanate with polyhydroxyl containing compounds having from 3 to about 8 OH groups per molecule such as, for example, glycerine, trimethylolpropane, pentaerythritol, sorbitol, sucrose, mixtures thereof and mixtures with dihydroxyl-containing compounds such that the average hydroxyl functionality of the mixture is at least about 2.5. It is preferred that the organic polyisocyanate be liquid; however in the event that it is a solid or semisolid or of a relatively high viscosity such that blending with the other components would be difficult or inconvenient, they may be prepared in a suitable solvent selected from those compositions which are employed as component (C) herein and any quantity of such component (C) employed as a solvent for the polyisocyanate is included as a portion of the total quantity of component (C) employed in the polyurethane composition. Suitable such solvents include, for example, trichlorobenzene, propylene carbonate and the like.

Suitable organic diisocyanates which are employed in the preparation of the prepolymers containing an average of at least 2.5 NCO groups include for example, 2,4-toluene-diisocyanate, 2,6-toluenediisocyanate, hexamethylene diisocyanate, p,p'-diphenylmethanediisocyanate, p-phenylenediisocyanate, hydrogenated methylene diphenyldiisocyanate (e.g. Hylene W) naphthalene diisocyanate, dianisidine diisocyanate, mixtures of one or more polyisocyanates and the like.

The prepolymers employed as the polyisocyanate, component (B), in the present invention have a percent free NCO content of from about 8 to about 40 and preferably from about 12 to about 32 percent by weight.

Suitable compounds which are employed as the modifier compound, component (C), in the present invention include those liquid compounds having a boiling point above about 150°C at atmospheric pressure and which moderate the reaction exotherm between components (A), (B) and (D) without substantial reaction therewith. They are selected from the group consisting of fatty oils, fatty acids, organic phosphates, organic phosphites, organic phosphonates, cyclic ethers, aromatic compounds, partially hydrogenated aromatic compounds, halogenated aliphatic compounds, cyclic sulfones, organic carbonates, liquid esters of carboxylic acids and mixtures thereof.

Suitable aromatic compounds which are employed as the liquid modifier compound having a boiling point above about 150°C (Component C) in the present invention include, for example, straight and branch chain aliphatic, alkoxy and halogen substituted benzenes, aromatic substituted benzene and aromatic ethers, such as, for example, propenyl benzene, propylbenzene, butylbenzene, ethyltoluene, butyltoluene, propyltoluene, diphenyl oxide, biphenyl, o-, m- and p-diethylbenzene, dodecylbenzene, octadecylbenzene, bromobenzene, 1-bromo-3-chlorobenzene, 1-bromo-4-fluorobenzene, 1-bromo-2-iodobenzene, 1-bromo-3-iodobenzene, 1-chloro-4-fluorobenzene, o-dibromobenzene, m-dibromobenzene, o-dichlorobenzene, m-dichlorobenzene, 1,3-dipropoxybenzene, 1-ethyl-4-propylbenzene, 1-fluoro-4-iodobenzene, 4-bromo-o-xylene, α-bromo-m-xylene, 4-bromo-m-xylene, α-chloro-m-xylene, 4-ethyl-m-xylene, 5-ethyl-m-xylene, 2-bromo-p-xylene, α-chloro-p-xylene, 2-ethyl-p-xylene, 2-ethyl-p-xylene, o-bromotoluene, m-bromotoluene, o-, m-, and p-chlorotoluene, tertiary butylstyrene, α-bromostyrene, β-bromostyrene, α-chlorostyrene, β-chlorostyrene, mixtures thereof and the like.

The above compounds are represented by the following general formula provided it is understood that such compounds represented by the formula are liquids and have boiling points at atmospheric pressure above about 150°C.

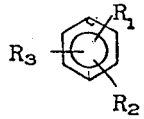

wherein $R_1$, $R_2$ and $R_3$ are independently selected from an alkyl group having from about 1 to about 18 carbon atoms, an alkenyl group having from 2 to about 3 carbon atoms, a halogen, an alkoxy group, an aromatic group and hydrogen.

Other suitable aromatic compounds which are employed as the liquid modifier compound (Component C) in the present invention include liquid multi-ring compounds having a boiling point above about 150°C such as, for example, 1-chloro-naphthalene, 1-bromo-naphthalene, mixtures thereof and the like.

Suitable partially hydrogenated multi-ring aromatic compounds which are employed as the liquid modifier compound (Component C) in the present invention include, for example, 1,4-dihydronaphthalene, 1,2,3,4-tetrahydronaphthalene, mixtures thereof and the like.

Suitable fatty acids and naturally occurring fatty oils which are employed as the liquid modifier compounds (Component C) in the present invention includes, for example, oleic acid, linoleic acid, linolenic acid, and the fatty acids resulting from the hydrolysis of naturally occurring oils of animal and vegetable origin including for example, linseed oil, castor oil, tung oil, fish oil, soya oil and the like and such acids as are produced as byproducts in chemical processes including for example, tall oil, the byproduct resulting from the conversion of wood pulp to paper by the sulfate process, mixtures of any of the above and the like.

Also operable as the liquid modifier compound are the naturally occurring fatty oils having boiling points above about 150°C including, for example, linseed oil, castor oil, tung oil, fish oil, soya oil, and the like.

Suitable organophosphorus compounds which are employed as the liquid modifier compound, component (C), include, for example, organo phosphates, organo phosphites and organo phosphonates having boiling points above 150°C.

Organo phosphates, phosphites and phosphonates which are employed as the liquid modifier compound include those liquid compounds represented by the formulae

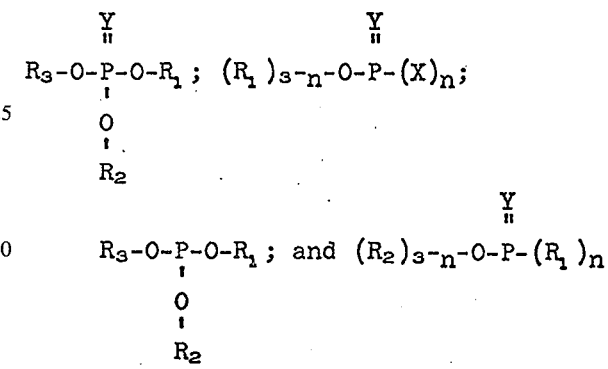

wherein $R_1$, $R_2$ and $R_3$ are independently selected from the group consisting of alkyl, alkoxyaryl, aryloxyaryl, alkaryl, aralkyl groups and halogen substituted derivatives thereof. Y is oxygen or sulfur, X is a halogen, i.e. chlorine, fluorine, bromine or iodine, n has a value of 1 or 2. Suitable compounds include, for example, tri-n-butyl phosphate, triethylphosphate, tricresylphosphate, tris-(beta-chloroethyl)phosphate, tris-(2,3-dibromopropyl)phosphate, butyl dichlorophosphate, 2-chloroethyl dichlorophosphate, ethyl dichlorophosphate, diethyl fluorophosphate, bis(2-chloroethyl) fluorophosphate, dibutyl chlorophosphate, isoamyl dichlorothionophosphate, ethyl dibromothiophosphate, 2-chlorophenyl dichlorophosphate, 2-methoxyphenyl dichlorophosphate, 2-phenoxyphenyl dichlorophosphate, 2-chloroethyl dichlorophosphite, tris(2-chloroethyl)phosphite, tributyl phosphite, tricresyl phosphite, triethyl phosphite, diethyl isoamylphosphonate, diethyl ethylphosphonate, dimethyl methylphosphonate, diethyl methylphosphonate, diisobutyl isobutylphosphonate, bis(2-bromopropyl)-2-bromopropane phosphonate.

When halo- or dihalo-phosphates or phosphites or their thiono derivatives are employed as the liquid modifier compound (component C), they are preferably added to the composition just prior to the organo-metal catalyst so as to minimize their reaction with the hydroxyl groups of the diol, component (A).

The organo phosphorus compounds may be prepared by procedures described in ORGANO-PHOSPHORUS COMPOUNDS, G. M. Kosolapoff, John Wiley & Sons, Inc., 1950.

Suitable liquid organic carbonates which are employed as the liquid modifier, component (C), in the present invention include the acyclic and cyclic carbonates represented by the formulae

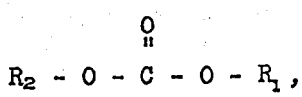

and

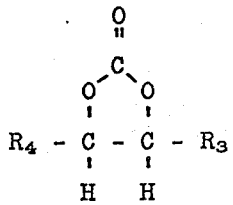

wherein each $R_1$ and $R_2$ are independently aryl, alkyl (having from about 1 to about 6 carbon atoms) or alkenyl groups (having from about 1 to about 6 carbon atoms) and substituted derivatives thereof and each $R_3$ and $R_4$ are selected from the same groups as $R_1$ and $R_2$ and hydrogen.

Suitable liquid acyclic organic carbonates which are employed in the present invention include, for example, bis(2-chloroethyl carbonate), di-n-butyl carbonate, butyldiglycol carbonate, cresyldiglycol carbonate, dibutyl carbonate, di-2-ethylhexyl carbonate, dimethallyl carbonate, dinonyl carbonate and the like. The organic acyclic carbonate may be prepared by procedures given in U.S Pat. No. 2,687,425.

Suitable liquid cyclic organic carbonates include, for example, propylene carbonate, butylene carbonate, styrene carbonate mixtures thereof and the like. The cyclic organic carbonates may be prepared in the manner described in Canadian Pat. No. 556,006.

Suitable cyclic polyethers which are employed as the liquid modifier (component C) include, for example, the cyclic tetramer of ethylene oxide, cyclic pentamer of propylene oxide, cyclic tetramer of propylene oxide, mixtures of the above and mixtures of cyclic pentamers and above of ethylene oxide and or propylene oxide. Any liquid cyclic polyether having a boiling point above 150°C may be employed as the liquid modifier in the present invention including cyclic polyethers prepared from butylene oxide, epichlorohydrin and the like.

The liquid cyclic polyether modifier compounds are prepared by procedures mentioned in "Cyclic Polyethers and Their Complexes with Metal Salts" by C. J. Pedersen, J. Am. Chem. Soc., Vol. 89, p. 7017–7036, 1968, "Twelve-Membered Polyether Rings. The Cyclic Tetramers of Some Olefin Oxides" by R. S. Kern; J. Org. Chem., Vol. 33, p. 388–390, 1968; British Pat. Nos. 785,229 and 1,108,921.

Suitable halogenated aliphatic compounds having a boiling point above about 150°C which are employed as the modifier compound in the present invention include, for example, tetrabromomethane, bromoform, hexachlorobutadiene, tetrachlorobutadiene, 1,2,3,3-tetrachlorobutane, 1,5-dibromopentane, 1,1,2-tribromopropane, 1,2,3-trichloropropene, polyepichlorohydrin diol having an equivalent weight above about 700 up to about 4,000, chlorinated paraffins, e.g. "Chlorowax" No. 40, 1-mercapto-3-chloropropanol-2, 3-chloropropane-1,2-diol, 2-chloropropane-1,3-diol, 1,3-dichloro-2-propanol, mixtures thereof and the like.

Suitable halogenated aliphatic compounds having hydroxyl groups and an atmospheric boiling point below about 150°C include for example, 2-chloroethanol, 2,2-dichloroethanol, 1-chloro-2-propanol, 1-bromo-2-propanol, 1-chloro-2-methyl-2-propanol, 1,1-dichloro-2-propanol, trifluoroethanol, monofluoroethanol, mixtures thereof and the like.

The hydroxyl-containing modifiers, because of the hydroxyl group, are capable of reacting with the polyisocyanate component (B), but nevertheless are suitable for moderating the reaction exotherm.

The halogenated aliphatic compounds which do not contain hydroxyl groups are employed in quantities of from about 0.2 to about 50 percent by weight of the sum of the weights of components (A), (B) and (C), and preferably from about 1 to about 10 percent by weight on the same basis i.e. the sum of the weights of components (A), (B) and (C). When the halogenated aliphatic compounds employed herein also contain hydroxyl groups and have a hydroxyl equivalent weight of less than 500, the quantity which is to be employed is from about 0.2 to about 10 and preferably from about 0.4 to about 5 percent by weight based upon the combined weights of (A), (B) and (C).

Suitable cyclic sulfones which are employed as the liquid modifier compound include the 5-membered cyclic sulfones such as, for example, 3-methylsulfolane (3-methyltetrahydrothiophene-1,1-dioxide) and the like.

Suitable esters of a carboxylic acid which may be employed as component (C) in the present invention include those esters prepared from mono- and polycarboxylic acids having from about 1 to about 20 carbon atoms such as for example phthalic, adipic, acetoacetic, formic, acetic, abietic, acids, and the like and wherein the ester portion contains from about 1 to about 20 carbon atoms such as methyl, ethyl, propyl, butyl, hexyl, cyclohexyl, octyl, decyl, dodecyl, eicosyl and the like so long as the carboxylic acid ester has a boiling point above about 150°C and is a liquid at room temperature.

These acid esters may be prepared by condensing an acid having from about 1 to about 20 carbon atoms with a saturated or unsaturated aliphatic alcohol having from about 1 to about 20 carbon atoms, with the proviso that the ester product is a liquid and has a b.p. >150°C.

The term "liquid modifier boiling above about 150°C" includes eutectic mixtures of the previously described classes of compounds which are solids at atmospheric pressure but said eutectic mixtures are a liquid at room temperature and atmospheric pressure which have boiling points above about 150°C. Also included in the definition are those solid compounds of the classes previously described which are dissolved in a liquid member of any of the described classes of compounds having boiling points above about 150°C wherein the resultant solution is a liquid at standard conditions of temperature and pressure and have boiling points at atmospheric pressure above about 150°C.

Suitable organo-metal catalysts for urethane formation which are employed in the present invention include, for example, organo-metal compounds of tin, zinc, lead, mercury, cadmium, bismuth, cobalt, manganese, antimony, iron and the like such as, for example, metal salts of a carboxylic acid having from about 2 to about 20 carbon atoms including, for example, stannous octoate, dibutyltin dilaurate, dibutyltin diacetate, ferric acetylacetonate, lead octoate, lead oleate, phenylmercuric propionate, cobalt naphthenate, lead naphthenate, mixtures thereof and the like.

It is preferred that the catalysts be employed in liquid form. Those catalysts which are not ordinarily liquids may be added as a solution in a solvent which is compatible with the other components employed in the composition of the present invention. Suitable such solvents include, for example, dioctylphthalate, polyoxyalkylene glycols, mineral spirits, dipropylene glycol, mixtures thereof and the like.

It has previously been stated that the quantity of the organo-metal catalyst is in the range of from about 0.1 to about 10 percent.

Rigid polyurethane products can be prepared by rapidly mixing the components of the compositions of the present invention. It is preferred to thoroughly blend together the components represented by (A), the diol, (B), the polyisocyanate and (C), the liquid modifier compound and then mixing the resultant mixture with component (D), the catalyst. Mechanical dispensing or combination mixing-dispensing devices can be employed by utilizing 2 or more streams of the individual components or mixtures of the components which are introduced into said device.

Other components including inert fillers such as, for example, sand, microballons, glass fibers, asbestos, aluminum granules, silicon carbide powder and the like, coloring agents, such as pigments and dyes including, for example, chromic oxide, ferric oxide, mixtures thereof and the like may be employed in the compositions of the present invention without detracting from the scope thereof.

The compositions of the present invention rapidly produce solid products which may be demolded, i.e. the articles produced therefrom may be removed from the mold, within about 5 minutes, usually within about 3 minutes and preferably within about 1 minute or less from the time the catalyst is blended into the mixture and do not require the application of external sources of heat to accomplish this, although in some circumstances it may be desirable to post cure, at elevated temperatures, the products in order to develop certain properties. The compositions of the present invention not only can be demolded within 5 minutes and often in less than 2 to 3 minutes, but the cast objects produced therefrom have developed sufficient strength properties to be employed immediately upon cooling to room temperature for their intended purpose. The cast objects are hot or warm to the touch immediately after removing from the mold due to the exotherm generated during the reaction. This is a valuable contribution to the urethane molding art, in that productivity can be increased employing a given quantity of molds.

The choice of the catalyst involves the desired time delay between the catalyst being mixed into the reagents and the liquid mix "instantly" solidifying. For example, if polymethylene polyphenylisocyanate is used along with dipropylene glycol and an ester of a dibasic acid such as dioctylphthalate as the liquid modifier compound, then the addition of about 1 percent stannous octoate catalyst will yield a delay or induction time of about 20 seconds before the mixture suddenly "freezes" into a solid. Substitution of a manganese carboxylate at the same catalyst level stretches this delay time to about 60 seconds, and lead octoate (24% Pb) exhibits a delay time of about 105 seconds before extremely rapid solidification occurs.

The change of isocyanate to a more reactive one, i.e. the substitution of a prepolymer prepared from toluene diisocyanate for polymethylene polyphenylisocyanate, correspondingly decreases the delay time before rapid solidification takes place at the same isocyanate level.

Suitable materials from which adequate molds, for casting the compositions of the present invention, may be prepared include polymers such as, for example, polyethylene, polypropylene, their copolymers and the like, polyurethanes, polysiloxane elastomers, Mylar, cured polyepoxides, mixtures thereof and the like.

It is preferred to employ relatively thin wall molds or molds having a low heat capacity or thermal conductivity. Heavy molds made of relatively high thermal conductivity materials such as aluminum, copper, iron or steel and the like may present curing problems, i.e. the reactants may not be readily demolded unless the mold is preheated to about 50°–90°C, especially when casting relatively thin sections. However, high thermal conductivity materials such as copper or aluminum can be employed as thin wall molds without preheating if the thermal capacity of the mold is relatively low compared to the amount of heat liberated in the casting.

The compositions of the present invention are useful as, but not restricted to such uses as, a casting material for preparing bearing surfaces, annular spacers, decorative objects, furniture or furniture components, gears or other machine components, threaded protective plugs and caps, and the like.

The following examples are illustrative of the present invention but are not to be construed as limiting the scope thereof in any manner.

EXAMPLE 1

A. An Example of the Present Invention

In a suitable container were thoroughly blended all the components of the composition except the catalyst. After the components except the catalyst were blended together, the catalyst was rapidly blended with the previous well-blended mixture and the resultant mixture was poured into a polyethylene beaker as a mold. The components were as follows:

14 grams of propylene glycol 46 grams of polymethylene polyphenylisocyanate having an average functionality of 2.6 and an NCO equivalent weight of about 133.

30 grams of chloronaphthalene 1 cc of stannous octoate catalyst (T-9 from M & T Chemicals).

The mixture suddenly solidified within about 30 seconds after catalyst addition and 30 seconds later the casting was removed from the mold. The rigid casting was free of bubbles and had a density of 1.15 grams/cc.

B. Experiment Showing Inoperability When Modifier Compound is Absent

The same procedure was employed as in Example 1–A but with the following components.

28 grams of propylene glycol 92 grams of polymethylenepolyphenylisocyanate employed in 1–A.

2 cc of stannous octoate catalyst (commercial).

The mixture suddenly solidified within about 30 seconds after catalyst addition but then the casting began to swell and warp. The resultant distorted casting had a density of 0.8 gram/cc.

EXAMPLE 2

A. An Example of the Present Invention

The same procedure was employed as in Example 1-A but with the following components.

18 grams of diethylene glycol
46 grams of polymethylene polyphenylisocyanate having an average functionality of 2.6 and an NCO equivalent weight of 133.
20 grams of cyclic propylene carbonate
1 cc of lead octoate (24% Pb)

The mixture suddenly solidified within about 20 seconds after catalyst addition and about 25 seconds later the resultant casting was removed from the mold. The dense, rigid casting had a density of 1.2 grams/cc.

B. Comparative Experiment Demonstrating Inoperability of Amine Catalysts

The same procedure was employed as in Example 1-A but with the following components.

18 grams of diethylene glycol
46 grams of polymethylene polyphenylisocyanate having an average functionality of about 2.6 and an NCO equivalent weight of about 133.
20 grams of cyclic propylene carbonate
1 cc of a 33 percent solution of triethylenediamine in dipropylene glycol.

The mixture required more than 6 minutes after catalyst addition to solidify and could not be removed from the mold within 10 minutes after catalyst addition because the casting was still tacky to the touch.

EXAMPLE 3

The same procedure was employed as in Example 1-A but with the following components.

21 grams of dipropylene glycol
46 grams of polymethylene polyphenylisocyanate having an average functionality of about 2.6 and an average NCO equivalent weight of about 133
10 grams of tributylphosphite
1 cc of lead octoate (24% Pb)

The mixture suddenly solidified within about 12 seconds after catalyst addition and the casting was removed from the mold 18 seconds later. The rigid, dense casting had a density of 1.07 grams/cc.

EXAMPLE 4

The same procedure was employed as in Example 1-A but with the following components.

21 grams of dipropylene glycol
46 grams of polymethylene polyphenylisocyanate having an average functionality of about 2.6 and an NCO equivalent weight of about 133.
30 grams of tricresyl phosphate
1 cc of stannous octoate (commercial)

The mixture suddenly solidified within about 20 seconds after catalyst addition and was removed from the mold 20 seconds later. The solid, rigid casting had a density of 1.13 grams/cc.

EXAMPLE 5

The same procedure was employed as in Example 1-A but with the following components.

26 grams of triethylene glycol
46 grams of polymethylene polyphenylisocyanate having an average functionality of about 2.6 and an NCO equivalent weight of about 133
20 grams of the cyclic tetramer ether of ethylene oxide
1 cc of dibutyltindilaurate catalyst The mixture suddenly solidified within about 15 seconds after catalyst addition and was removed from the mold about 15 seconds later. The dense, rigid casting had a density of 1.16 gram/cc.

EXAMPLE 6

The same procedure was employed as in Example 1-A but with the following components.

26 grams of triethyleneglycol
46 grams of polymethylene-polyphenylisocyanate having an average functionality of about 2.6 and an NCO equivalent weight of about 133
20 grams of distilled Tall oil (Actinol D-29LR commercially available from Arizona Chemical Co.) and having the following physical properties:

| | |
|---|---|
| Acid value | 190 |
| Saponification value | 193 |
| % Fatty acids | 69 |
| Resin acids, % | 29 |
| Unsaponifiables, % | 2 |
| Gardner-Holdt Viscosity at 25°C | D |
| Weight per gallon at 25°C | 7.85 lbs. |

1 cc of stannous octoate (commercial)

The mixture suddenly solidified within about 15 seconds after catalyst addition and was removed from the mold within about 40 seconds after catalyst addition. The rigid casting had a density of 1.08 grams/cc.

EXAMPLE 7

The same procedure was employed as in Example 1-A except that the mixture was cast into a sheet in a Mylar tray and employed the following components.

42 grams of dipropylene glycol
92 grams of polymethylene polyphenylisocyanate having an average functionality of about 2.6 and an average NCO equivalent weight of about 133
20 grams of cyclic 1,2-propylene carbonate
1 cc of stannous octoate (commercial)

The mixture suddenly solidified within about 30 seconds after catalyst addition and was demolded within about 60 seconds after catalyst addition.

Thr rigid dark brown sheet had a density >1 gram/cc, an ultimate tensile strength of 9,018 psi at an elongation of 14 percent.

EXAMPLE 8

The same procedure was employed as in Example 1-A but with the following components.

33 grams of tripropylene glycol
47 grams of polymethylene polyphenylisocyanate having an average functionality of 3.2 and an average NCO equivalent weight of 135.
20 grams of the cyclic ether tetramer of ethylene oxide
1 cc of stannous octoate (commercial)

The mixture suddenly solidified within about 15 seconds after catalyst addition and was demolded within about 30 seconds after catalyst addition. The rigid casting had a density of 1.06 grams/cc and a Shore D hardness of 93.

EXAMPLE 9

A. An isocyanate terminated prepolymer was prepared by blending 4 moles of an 80/20 mixture of 2,4-

/2,6-toluenediisocyanate with 1 mole of the reaction product of glycerine with propylene oxide in a molar ratio of 1:3 respectively. The resultant product contained the reaction product of about 1 mole of toluenediisocyanate per hydroxyl group of the glycerinepropylene oxide reaction product and 1 mole of unreacted toluenediisocyanate. The product therefore had an average functionality of about 2.5 and a percent free NCO of about 21.7.

B. The same procedure was employed as in Example 1–A but with the following components.

14 grams of diethylene glycol
50 grams of the prepolymer prepared in A above (9–A)
30 grams of Chlorowax No. 40 (a liquid chlorinated paraffin containing about 40 percent chlorine)
1 cc of lead octoate (24% Pb)

The mixture suddenly solidified within about 20 seconds after catalyst addition and was demolded within about 30 seconds after catalyst addition. The rigid casting had a density of 1.14 grams/cc and a Shore D hardness of 87.

EXAMPLE 10

The same procedure was employed as in EXample 1–A but with the following components.

14 grams of diethylene glycol
50 grams of the NCO terminated prepolymer prepared in Example 9–A blended with 25 grams of trichlorobenzene
1 cc of lead octoate catalyst The resultant mixture suddenly solidified within about 15 seconds after catalyst addition and was demolded within about 30 seconds after catalyst addition. The solid translucent casting had a density >1 gram/cc and a Shore D hardness >90.

EXAMPLE 11 (COMPARATIVE)

Using a Polyisocyanate Having a NCO Functionality Below 2.5

A. An NCO terminated prepolymer was prepared by reacting 8 moles of an 80/20 blend of 2,4-/2,6-toluenediisocyanate with one mole of the reaction product of glycerine with propylene oxide in a molar ratio of 1:3 respectively. The resultant prepolymer had an average NCO functionality of about 2.2 and a percent NCO of about 32.

B. The same procedure was employed as in Example 1–A but with the following components.

33 grams of diethyleneglycol
45 grams of the prepolymer prepared in 11–A above
30 grams of Chlorowax No. 40 (described in Example 9–B)
1 cc of lead octoate (24% Pb)

Six minutes after catalyst addition, the mixture was still a viscous frothy liquid.

EXAMPLE 12

The same procedure was employed as in Example 1–A but with the following components.

21 grams of dipropylene glycol
46 grams of polymethylene polyphenylisocyanate having an average functionality of about 2.6 and an average NCO equivalent weight of about 133
1.2 grams of hexachlorobutadiene.
1 cc of stannous octoate (commercial The mixture instantly solidified within about 25 seconds after catalyst addition and was demolded within about 50 seconds after catalyst addition. The solid casting had a density greater than 1 gram/cc and a Shore D hardness of 95.

EXAMPLE 13

The same procedure was employed as in Example 1–A but with the following components.

21 grams of dipropylene glycol
46 grams of polymethylene polyphenyl isocyanate having an average functionality of about 2.6 and an NCO equivalent weight of about 133
30 grams of dioctylphthalate
0.5 cc of stannous octoate (commercial)

The resultant mixture instantly solidified within about 20 seconds and was demolded within about 40 seconds after catalyst addition. The rigid casting had a density >1 gram/cc and a Shore D hardness of 94.

EXAMPLE 14

The same procedure was employed as in Example 1–A but with the following components.

30 grams of tripropylene glycol
46 grams of polymethylene polyphenylisocyanate having an average functionality of about 2.6 and an NCO equivalent weight of about 133
30 grams of methylabietate
1 cc of stannous octoate (commercial)

The mixture instantly solidified within about 25 seconds and was demolded within about 55 seconds after catalyst addition. The rigid casting had a density >1 gram/cc and a Shore D hardness of 92.

EXAMPLE 15

The same procedure was employed as in Example 1–A but with the following components.

30 grams of tripropylene glycol
46 grams of polymethylene polyphenylisocyanate having an average functionality of about 2.6 and an NCO equivalent weight of about 133.
30 grams of dimethyl adipate
1 cc of stannous octoate (commercial)

The mixture suddenly solidified within about 25 seconds and was demolded within about 45 seconds after catalyst addition. The rigid casting had a density >1 gram/cc.

EXAMPLE 16

A prepolymer was prepared by reacting 128 grams of the reaction product of pentaerythritol with propylene oxide in a molar ratio of about 1:5 respectively, the product having an OH equivalent weight of about 78 with 290 grams of an 80/20 mixture of the 2,4-/2,6-isomers of toluene/diisocyanate in the presence of 209 grams of trichlorobenzene as a solvent for the prepolymer. The resultant prepolymer had an average NCO functionality of about 3 and a percent free NCO of about 13.4.

The above prepared prepolymer was employed in preparing a rapid setting polyurethane employing the procedure of Example 1–A and the following components.

53 grams of the above prepared prepolymer which is actually about 35.3 grams of the prepolymer and 17.7 grams of trichlorobenzene
9 of diethylene glycol 1 cc of lead octoate (24% Pb)

The mixture suddenly solidified within about 20 seconds after catalyst addition and was demolded within about 40 seconds after catalyst addition. The rigid casting had a density >1 gram/cc and a Shore D hardness of 94.

EXAMPLE 17

The same procedure was employed as in Example 1-A but with the following components.

75 grams of the reaction product of bisphenol A with ethylene oxide in a molar ratio of about 1:4 and having a percent OH of about 7.97.

46 grams of polymethylene polyphenylisocyanate having an average functionality of about 2.6 and an NCO equivalent weight of about 133.

20 grams of dioctylphthalate 1 cc of stannous octoate (commercial)

The mixture suddenly solidified within about 30 seconds after catalyst addition and was removed from the mold within about 60 seconds after catalyst addition. The opaque, tan, rigid product had a density of >1 gram/cc and a Shore D hardness of 93.

EXAMPLE 18

The same procedure as in Example 1-A but with the following components.

12 grams of 1,3-butylene glycol 46 grams of polymethylene polyphenylisocyanate having an average functionality of about 2.6 and an NCO equivalent weight of about 133.

30 grams of dioctylphthalate 1 cc of stannous octoate (commercial)

The mixture suddenly solidified within about 20 seconds after catalyst addition and was removed from the mold within about 60 seconds after catalyst addition. The rigid, opaque, tan casting had a density of 1.06 grams/cc and a Shore D hardness of 88.

EXAMPLE 19

The same procedure was employed as in Example 1-A but with the following components.

21 grams of dipropylene glycol 46 grams of polymethylene polyphenylisocyanate having an average functionality of about 2.6 and a NCO equivalent weight of about 133.

30 grams of dioctyl phthalate 1 cc lead octoate (24% Pb)

The mixture suddenly solidified within about 105 seconds after catalyst addition and was removed from the mold within about 3½ minutes after catalyst addition. The rigid casting had a density of >1 gram/cc.

EXAMPLE 20

The same procedure was employed as in Example 1-A but with the following formulation.

21 grams of dipropylene glycol 46 grams of polymethylene polyphenylisocyanate 30 grams of dioctylphthalate 1 cc of "12% Manganese DC Chem-All" (a manganese carboxylate containing 12 weight percent manganese and containing 75 weight percent non-volatiles and having a Gardner color of a maximum of 16 and a maximum Gardner-Holdt viscosity at 77°F of C commercially available from Mooney Chemicals, Inc.)

The mixture suddenly solidified within about 60 seconds after catalyst addition and was removed from the mold within about 120 seconds after catalyst addition. The rigid casting had a density >1 gram/cc.

EXAMPLE 21

The same procedure was employed as in Example 7 but with the following components.

42 grams of dipropylene glycol 92 grams of polymethylene polyphenyl isocyanate having an average functionality of about 2.6 and an NCO equivalent weight of 133.

60 grams of dioctyl phthalate 1 cc of stannous octoate (commercial)

The mixture instantly solidified within about 20 seconds after catalyst addition and was removed from the mold within about 40 seconds after catalyst addition. The rigid opaque casting had a density >1 gram/cc, a Shore D hardness of 94, a tensile strength of 9,077 psi and an elongation of 13 percent.

EXAMPLE 22

An NCO-containing prepolymer was prepared from 80 grams of bisphenol A (p,p'-isopropylidene diphenol) powder was dissolved in 80 grams of triethylphosphate.

The procedure of Example 7 was employed with the following components.

80 grams of the bisphenol A-triethylphosphate mixture i.e. 40 grams bisphenol A and 40 grams triethyl phosphate 46 grams of polymethylene polyphenyl isocyanate having an average functionality of about 2.6 and an NCO equivalent weight of about 133.

1 cc of stannous octoate (commercial)

The mixture suddenly solidified within about 50 seconds after catalyst addition and was removed from the Mylar tray within about 90 seconds after catalyst addition. The rigid, dark amber casting had a density > than 1 gram/cc and when placed in the flame of a Bunsen burner and subsequently removed, it was found to exhibit self extinguishing characteristics and appeared to exhibit excellent char formation.

EXAMPLE 23

In each of the following experiments, the procedure of Example 1 herein was employed, employing the components given in the following Table.

The results obtained therefrom are also reported in the following Table.

| COMPONENT AND PROPERTY | Experiment 1 (Present Invention) | Experiment 2 (Comparative Experiment) | Experiment 3 (Comparative Experiment) | Experiment 4 (Comparative Experiment) | Experiment 5 (Comparative Experiment) |
|---|---|---|---|---|---|
| PAPI[1], grams | 46 | 46 | 46 | 46 | 46 |
| Chlorowax No. 40[2] | 30 | 30 | 30 | 30 | none |
| Dipropylene glycol | 23 | 23 | 23 | 23 | 23 |
| Catalyst, type/quantity | T-9[3]/1cc | DABCO[4]/1cc | DMEA[5]/1cc | none | T-9/1cc |
| Solidification time[6] | 15 sec. | 3-5 min. | 3 - 4 ½ min. | 25 - 30 min. | 10 sec. |
| Demold time,[6] sec. | 30 | between 5½ - 7½ min. | between 5 - 6 min. | 55 min. | 60 |

—Continued

| COMPONENT AND PROPERTY | Experiment 1 (Present Invention) | Experiment 2 (Comparative Experiment) | Experiment 3 (Comparative Experiment) | Experiment 4 (Comparative Experiment) | Experiment 5 (Comparative Experiment) |
|---|---|---|---|---|---|
| Density, g/cc | 1.27 | <1 | 0.89 | 1.17 | .9 |
| Remarks | solid, khaki-colored, bubble-free casting | solid, khaki-colored casting was filled with microvoids | product swelled due to formation of microbubbles | solid, khaki-colored, bubble-free casting | between 60 and 180 seconds, the casting swelled, distorted and developed gross fissures or cracks |

[1] PAPI was a polymethylene polyphenylisocyanate having an average functionality of about 2.6 and an average NCO equivalent weight of about 134.
[2] Chlorowax No. 40 was a liquid chlorinated paraffin containing about 40% chlorine.
[3] T-9 was stannous octoate, commercially available from M&T Chemicals.
[4] DABCO was a 33% solution of triethylene diamine in dipropylene glycol.
[5] DMEA was dimethyl ethanolamine.
[6] The time was measured from the instant all of the components were blended together.

The above experiments clearly indicate that the products of the present invention cannot be prepared (1) when an amine-containing catalyst is employed, (2) when a modifier compound is not employed or (3) when no catalyst is employed.

EXAMPLE 24

The procedure of Example 7 was employed with the following components:
  52 grams of polyoxypropylene glycol having an OH equivalent weight of about 151.
  46 grams of a polymethylene polyphenylisocyanate having an average functionality of about 2.7–2.8 and an NCO equivalent weight of about 133.
  1 gram of a 50/50 by weight mixture of 1-chloro-2-propanol and 2-chloroethanol
  0.4 cc of T–9 catalyst (a stannous octoate catalyst solution containing 28 percent tin, 97 percent of which is stannous, commercially available from M & T Chemicals).

The mixture suddenly solidified within about 1 minute and was demolded within about 2 minutes after catalyst addition. The solid, rigid cast sheet had a density of about >1 g/cc, a Shore D hardness of about >80 and a tensile strength of about 6,363 psi at an elongation of 8 percent.

EXAMPLE 25

In the following Experiments, the procedure of Example 1–A was employed with the indicated compositions.

Experiment A (An example of the present invention)
  23 grams of dipropylene glycol
  46 grams of a polymethylene polyphenylisocyanate having an average functionality of about 2.7–2.8 and an NCO equivalent weight of about 133.
  0.5 grams of 2-chloroethanol
  0.4 cc of T–9 catalyst.

The mixture suddenly solidified within about 30 seconds and was demolded within about 60 seconds after catalyst addition. The resultant solid, rigid casting had a density of about >1 g/cc and a Shore D hardness of about >85.

Experiment B (A Comparative Experiment employing too much modifier i.e. greater than 10 percent e.g. 12.66 percent)
  23 grams of dipropylene glycol
  46 grams of polymethylene polyphenylisocyanate having an average functionality of about 2.7–2.8 and an NCO equivalent weight of about 133.
  10 grams of 2-chloroethanol
  0.4 cc of T–9 catalyst.

The mixture suddenly foamed up and solidified within about 60 seconds after catalyst addition. The cellular product had a density of about 0.31 g/cc.

EXAMPLE 26

The procedure of Example 7 was employed with the following components:
  24 grams of dipropylene glycol
  46 grams of a polymethylene polyphenylisocyanate having an average functionality of about 2.7–2.8 and an NCO equivalent weight of about 133.
  6.5 grams of a mixture containing 25 weight percent 2-chloro-1-propanol and 75 weight percent 1-chloro-2-propanol.
  1 cc of T–9 catalyst.

The mixture suddenly solidified within about 30 seconds and was demolded within about 90 seconds after catalyst addition. The solid, rigid cast sheet had a density of about >1 g/cc and a Shore D hardness of about >85.

I claim:

1. A rigid, non-cellular composition having a density of at least about 1 gram/cc which is demoldable, without the application of an external source of heat, within about 5 minutes after admixture of the components of the composition which is the reaction product of a polyurethane-forming composition comprising
  A. a dihydroxyl-containing compound having a hydroxyl equivalent weight of less than about 250;
  B. an organic polyisocyanate having an NCO functionality of at least about 2.5;
  C. a liquid modifier compound or mixture of such compounds and which moderates the reaction exotherm selected from the group consisting of monohydroxyl-containing halogenated aliphatic compounds having an atmospheric boiling point below about 150°C and an OH equivalent weight of less than about 500; and
  D. an organometallic catalyst;
wherein components (A) and (B) are present in quantities such that the NCO:OH ratio is from about 0.8:1 to about 1.5:1, component (C) is present in quantities of from about 0.1 to about 10 percent by weight of the combined weights of components (A), (B) and (C); and component (D) is present in quantities of from about 0.02 to about 5.0 percent by weight of the combined weight of components (A), (B) and (C).

2. The composition of claim 1 wherein component (D) is employed in quantities of from about 0.1 to about 2.0 percent by weight of the combined weight of components (A), (B) and (C) and the NCO:OH ratio is from about 0.9:1 to about 1.2:1.

3. The composition of claim 2 wherein component (C) Is employed in a quantity of from about 0.4 to about 5 percent by weight of the combined weight of components (A), (B) and (C).

4. The composition of claim 3 wherein component (C) is selected from the group consisting of 1-chloro-2-propanol, 2-chloroethanol and 2-chloro-1-propanol.

5. The composition of claim 3 wherein component (C) is a mixture of 1-chloro-2-propanol and 2-chloro-1-propanol.

6. The composition of claim 1 cast as a furniture component.

7. The composition of claim 1 cast as a decorative object.

8. The composition of claim 1 cast as a machine component.

9. A process for producing solid, rigid, polyurethane articles having a density of at least 1 g/cc, a percent elongation of less than 100, and which can be demolded within a period of about 5 minures without the addition of an external source of heat which process comprises 1. admixing the components of a composition comprising A. a dihydroxyl-containing compound having a hydroxyl equivalent weight of less than about 250;

B. an organic polyisocyanate having an NCO functionality of at least about 2.5;

C. a liquid modifier compound or mixture of such compounds and which moderates the reaction exotherm selected from the group consisting of monohydroxylcontaining halogenated aliphatic compounds having an atmospheric boiling point below about 150°C and an OH equivalent weight of less than about 500; and D. an organometallic catalyst;

wherein components (A) and (B) are present in quantities such that the NCO:OH ratio is from about 0.8:1 to about 1.5:1, component (C) is present in quantities of from about 0.2 to about 10 percent by weight of the combined weights of components (A), (B) and (C); and component (D) is present in quantities of from about 0.1 to about 1.0 percent by weight of the combined weight of components (A), (B) and (C):

2. placing the admixed composition into a suitable mold wherein said composition solidifies within less than about 5 minutes to a solid having the aforesaid density and elongation; and 3. subsequently demolding the resultant article from the mold.

10. The process of claim 9 wherein component (D) is employed in quantities of from about 0.1 to about 2.0 percent by weight of the combined weight of components (A), (B) and (C) and the NCO:OH ratio is from about 0.9:1 to about 1.2:1.

11. The process of claim 10 wherein component (C) is employed in a quantity of from about 0.4 to about 5 percent by weight of the combined weight of components (A), (B) and (C).

12. The process of claim 11 wherein component (C) Is selected from the group consisting of 1-chloro-2-propanol, 2-chloroethanol and 2-chloro-1-propanol.

13. The process of claim 11 wherein component (C) is a mixture of 1-chloro-2-propanol and 2-chloro-1-propanol.

14. The process of claim 9 wherein said mold is that of a furniture component.

15. The process of claim 9 wherein said mold is that of a decorative object.

16. The process of claim 9 wherein said mold is that of a machine component.

\* \* \* \* \*

UNITED STATES PATENT OFFICE
CERTIFICATE OF CORRECTION

PATENT NO. : 3,883,484
DATED : May 13, 1975
INVENTOR(S) : Franciszek Olstowski

It is certified that error appears in the above-identified patent and that said Letters Patent are hereby corrected as shown below:

Col. 16, line 63, change "0.02 to about 5.0" to read --0.1 to about 10--.

Col. 18, line 7, change "1.0" to read --10--.

Signed and Sealed this twenty-eight Day of October 1975

[SEAL]

Attest:

RUTH C. MASON
Attesting Officer

C. MARSHALL DANN
Commissioner of Patents and Trademarks